(12) United States Patent
Abernethy, Jr. et al.

(10) Patent No.: US 7,881,234 B2
(45) Date of Patent: Feb. 1, 2011

(54) DETECTING INTERRUPTIONS IN AUDIO CONVERSATIONS AND CONFERENCES, AND USING A CONVERSATION MARKER INDICATIVE OF THE INTERRUPTED CONVERSATION

(75) Inventors: Michael Negley Abernethy, Jr., Pflugerville, TX (US); Travis M. Grigsby, Austin, TX (US); Justin K Hong, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 11/550,832

(22) Filed: Oct. 19, 2006

(65) Prior Publication Data

US 2008/0095348 A1 Apr. 24, 2008

(51) Int. Cl.
*H04L 12/16* (2006.01)
(52) U.S. Cl. .................................. 370/260; 709/201
(58) Field of Classification Search ................. 370/260; 709/204; 379/265.01
See application file for complete search history.

(56) References Cited

U.S. PATENT DOCUMENTS

| | | | |
|---|---|---|---|
| 5,737,405 A | * | 4/1998 | Dezonno ............... 379/265.07 |
| 5,867,144 A | | 2/1999 | Wyard |
| 6,134,377 A | * | 10/2000 | Komedashi et al. ........... 386/46 |
| 2002/0196284 A1 | | 12/2002 | Berquist et al. |
| 2004/0201630 A1 | | 10/2004 | McInerney |
| 2005/0041786 A1 | * | 2/2005 | Craig ..................... 379/88.17 |
| 2005/0066287 A1 | | 3/2005 | Tattrie et al. |
| 2006/0036688 A1 | * | 2/2006 | McMahan et al. ........... 709/206 |
| 2006/0090137 A1 | | 4/2006 | Cheng et al. |
| 2007/0086365 A1 | * | 4/2007 | Chen et al. .................. 370/260 |

FOREIGN PATENT DOCUMENTS

WO WO 95/24114 9/1995

* cited by examiner

*Primary Examiner*—Creighton Smith
(74) *Attorney, Agent, or Firm*—J. B. Kraft; David A. Mims

(57) ABSTRACT

An implementation for detecting interruptions in audio conversations between a plurality of participants comprising continuously recording the most recent predetermined time segment of the conversation stream of one participant in the conversation, monitoring the conversation stream of the participant for interruptions in said conversation stream and storing the most recent segment prior to the interruption in response to a detection of an interruption. The segment is represented by a conversation marker. The user may then select the conversation marker to playback this most recent segment, so that he may then decide whether he wishes to resume or pursue the interrupted conversation fragment.

20 Claims, 5 Drawing Sheets

TERMINAL TOM - ACTIVE CALL TO MAX

CONVERSATION MARKERS *
-LOOK, I REALLY (7)
-AND HER RING (11)

15

*THESE MARKERS INDICATE INTERRUPTED SPEECH (CLICK ON ITEM TO PLAY BACK) — 18

TERMINAL MAX - ACTIVE CALL FROM TOM

CONVERSATION MARKERS *

-AND HER RING (11)

14

*THESE MARKERS INDICATE INTERRUPTED SPEECH (CLICK ON ITEM TO PLAY BACK) — 18

FIG. 2

DETECTING INTERRUPTIONS IN AUDIO CONVERSATIONS AND CONFERENCES, AND USING A CONVERSATION MARKER INDICATIVE OF THE INTERRUPTED CONVERSATION

TECHNICAL FIELD

The present invention relates to computer controlled implementations for tracking of telephone and like audio conversations and conferences between a plurality of participants, and particularly to preventing interrupted conversation threads from being overlooked.

BACKGROUND OF RELATED ART

With the globalization of business, industry and trade wherein transactions and activities within these fields have been changing from localized organizations to diverse transactions over the face of the world, the telecommunications industries have been expanding rapidly. This was, of course, accelerated by the rapid expansion of the World Wide Web (Web) that gave rise to Internet Protocol (IP) telecommunications wherein voice and other audio telecommunications are transmitted over the Internet. In addition, restrictions on travel, as well as attempts at energy conservation, have made teleconferencing more attractive.

With this expansion of telephone channels, conferences and conversations throughout the world, involving a plurality of participants, have become part of the daily routine in most business, educational and governmental institutions. However, in view of language, cultural and time differences, participants frequently find such conferences and conversations difficult to monitor and control as to achieve the purposes of the participants. As a result, the telecommunications industry is seeking implementations for making telephone conversations and conferences easier on the participants.

SUMMARY OF THE PRESENT INVENTION

The present invention provides an implementation for the handling of interrupts in the conversation of a participant resulting from overlapping conversation streams, e.g. two participants speaking at once or one participant starting to speak before the other has completed his conversation. The invention recognizes that in conversations, and particularly in conversations involving a number of participants as in a conference telephone situation, or where the participants have some language differences, it is quite easy for a participant to forget a fragment of his statement that has been overridden as a result of an interrupt. The present invention is directed to implementations for prompting the participant so that he does not forget or overlook the overridden speech fragment.

Accordingly, the present invention provides an implementation for detecting interruptions in audio conversations between a plurality of participants comprising continuously recording the most recent predetermined time segment of the conversation stream of one participant in the conversation, monitoring the conversation stream of the one participant for interruptions in the conversation stream and storing the most recent segment prior to the interruption in response to a detection of an interruption. The segment is represented by a conversation marker that is displayed. The user may then select the conversation marker to playback this most recent segment so that he may decide whether he wishes to pursue the interrupted conversation fragment.

The invention may be effectively implemented in telephones having built-in displays, such as mobile wireless, e.g. cellular telephones. The invention is particularly effective in telephones with associated laptop or desktop displays that function via the Internet using IP telecommunication protocols.

Also, playing back the most recent segment may be to other participants in the teleconference in addition to the one participant whose conversation is being monitored.

The fundamentals of the present invention are also applicable to conferences other than telephone conferences. It is now becoming customary to equip conferees in an auditorium or conference room with a computer controlled display speech recognition system. The present invention may be used to monitor the audio in such an environment.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 2 shows two illustrative display screens of two respective participants in a telephone conversation with interruptions;

DETAILED DESCRIPTION OF THE PREFERRED EMBODIMENT

Figure 1:
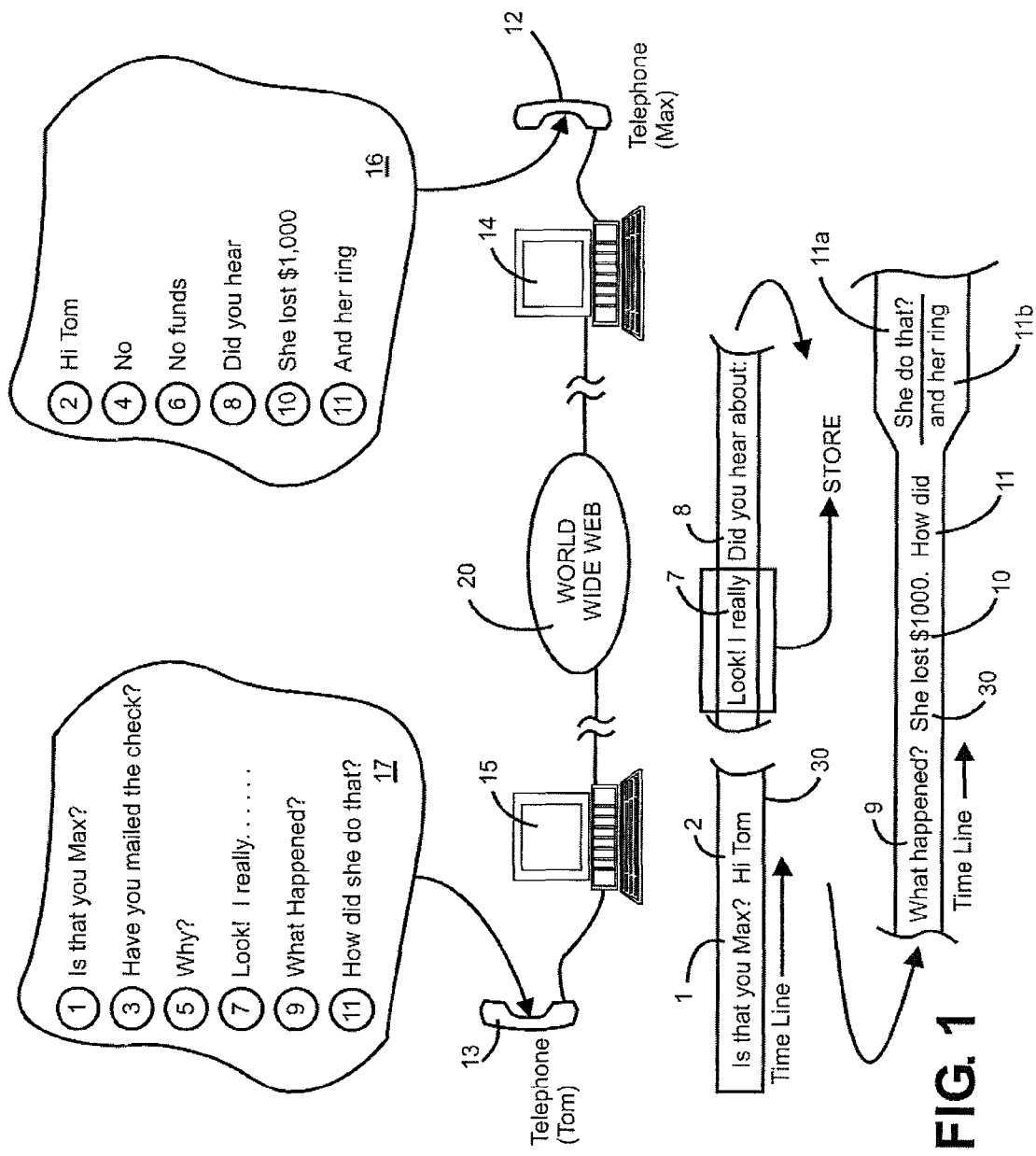
FIG. 1 is a generalized diagrammatic view of a portion of a Web IP Telecommunications network on which the present invention may be implemented.

Referring to FIG. 1, there is illustrated a generalized view of an interconnected portion of an IP telephone environment involving transmissions over the Internet or Web to illustrate the invention through a telephone conversation involving telephones 12 and 13 interconnected via the Web 20 through their respective display computer Web terminals 14 and 15. For the purpose of this illustration, the IP telephone environment has been selected because, as set forth above, IP teleconferences involving diverse callers are more likely to be subject to conversation interruption problems. However, the present invention is equally advantageous in conversations involving conventional PSTN (Public Switched Telephone Network) telephones. Referring back to FIG. 1, for simplicity in illustration, let us assume that we have a telephone conversation between two participants: Max using telephone 12 and Tom using telephone 13. In balloons 16 and 17 respectively associated as shown with Max and Tom, their conversation segments are listed in chronological sequence with the conversation segments numbered from 1 through 11. Also, the same sequence of conversation segments, numbered from 1 through 11 is shown, before in FIG. 1, as a chronological time line 30. In following the sequence, as the normal conversation continues, the conversation on both telephones 12 and 13 is being monitored for interruptions in the conversation stream of each respective participant Max and Tom. The monitoring is being carried out on the associated display computer 14 and 15 of each telephone. Also, as will be hereinafter described in greater detail, the most recent limited time segment, e.g. 7 seconds, of the conversation on each telephone is temporarily recorded.

In the conversation stream shown in balloons 16 and 17, and more clearly in time line 30, conversation statement 7 by Tom: "Look, I really . . . ." is interrupted by statement 8 by Max: "Did you hear about . . . ". The recorded seven second segment associated with statement 7 is stored as a conversation marker on Tom's computer 15. With respect to item 11 shown in each balloon 16 and 17 and indicated in the sequential time line 30 as overlapping items 11a and 11b, the result is an interrupt in both conversations, Tom's and Max's. Therefore, item 11a will result in the storage of a conversation marker in Tom's display computer 15 while item 11b will result in the storage of a conversation marker in Max's display computer 14.

The display on respective computers 14 and 15 with appropriate conversation markers is shown in FIG. 2. Tom's display 15 has two conversation markers indicative of two interrupts, while Max's display has one conversation marker indicative of a single interrupt. Instruction 18 advises users to click on conversation markers to playback interrupted conversation segments so that the user is able to decide whether to pursue the interrupted fragments.

While the playback of a stored segment resulting from an interrupt is usually played back by and for the benefit of the participant whose conversation stream has been interrupted, there may be circumstances wherein it is advantageous to provide the playback to other participants in the conference. The present invention may enable the participant selecting the playback to also provide his stored playback segment to other participants through conventional IP telephone transmissions.

Also, the participant, using conventional IP telephone technology, wherein his audio conversation stream is shown on his associated computer display during his telephone conversation, may also be set up to have his audio playback shown on the associated display.

While this invention has been illustrated with respect to FIGS. 1 and 2 using personal computer displays associated with the participant's telephone, the invention may be used effectively with telephones such as wireless telephones, e.g. cellular telephones, having incorporated displays.

Since this embodiment is being presented using IP telecommunications, a general description of this technology is appropriate. In IP telecommunications, voice and other audio telecommunications are transmitted over the Internet or Web and are broken down into voice packets that are digitized and transmitted over the Internet using IP telecommunication protocols. The text, *IP Telephony Demystified*, Ken Camp, published 2003, McGraw-Hill, New York, N.Y., describes such transmission of voice packets, particularly in Chapter three, pp. 54-69. This has become the basic Voice Over IP (VOIP) which has become the primary technology used to transmit voice and audio content of the Internet or Web (these terms are used interchangeably herein). This VOIP technology is described in greater detail (page 870) in *Newton's Telecom Dictionary*, Harry Newton, 2003, CMP Books, San Francisco, Calif., as well as in the above-referenced text *IP Telephony Demystified* at pp. 222-223.

Figure 3:
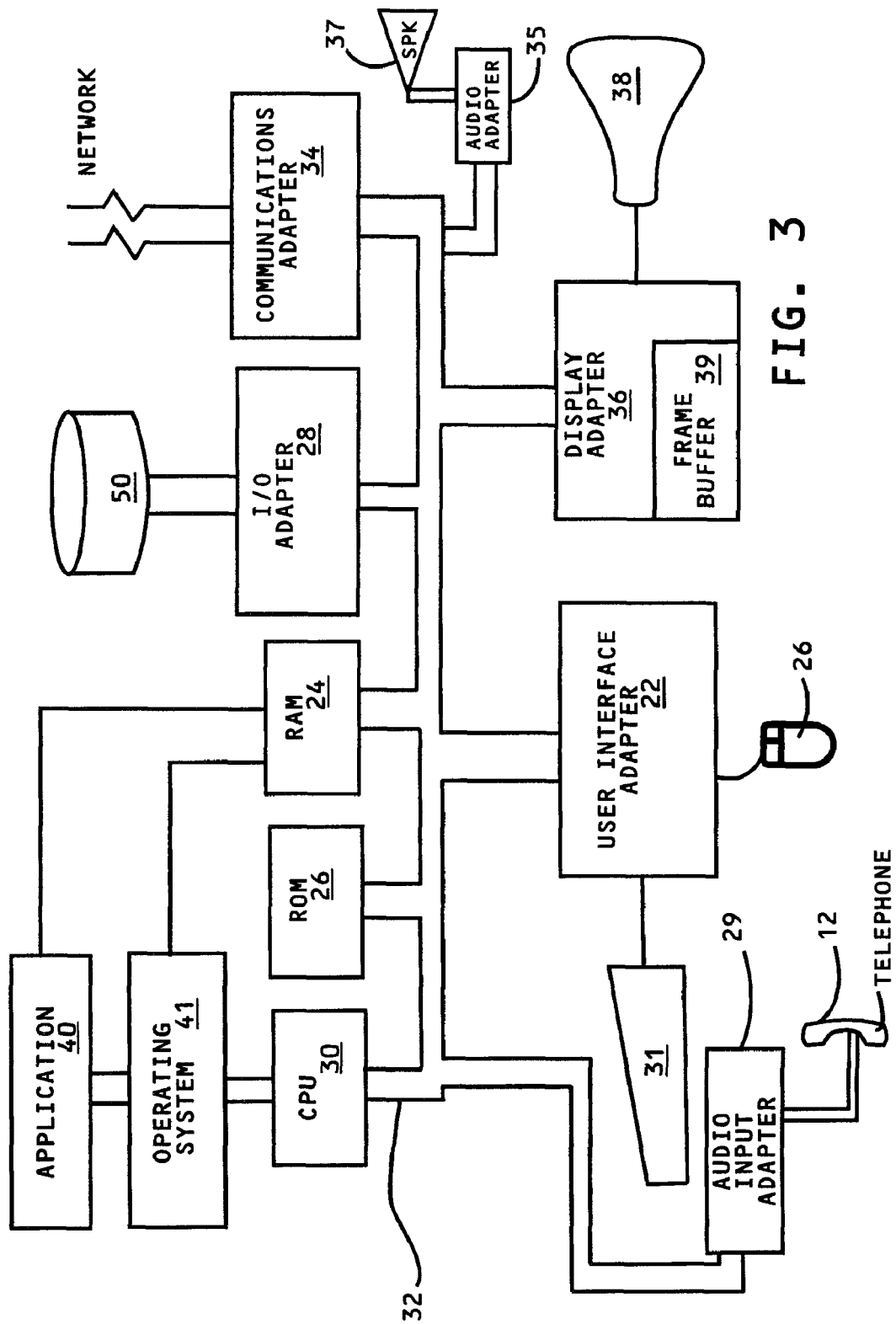
FIG. 3 is a block diagram of a generalized display computer system including a processor unit that may perform the functions of the display computers through which IP telecommunications may be carried out in the practice of the present invention.

Referring to FIG. 3, a typical data processing system is shown that may function as the Web display terminals or stations, e.g. terminals 14 and 15 used in the illustrative IP telecommunications implementation of this invention. A central processing unit (CPU) 30, may be one of the commercially available microprocessors in personal computers available from International Business Machines Corporation (IBM) or Dell Corporation. The CPU is interconnected to various other components by system bus 32. An operating system 41 runs on CPU 30, provides control and is used to coordinate the function of the various components of FIG. 1. Operating system 41 may be one of the commercially available operating systems, such as the AIX 6000™ operating system available from IBM; Microsoft's Windows XP™ or Windows2000™, as well as UNIX and other IBM AIX operating systems. Application programs 40, controlled by the system, are moved into and out of the main memory Random Access Memory (RAM) 24. These programs include the application programs of the present invention for detecting interruptions in audio conversations with a plurality of participants. A Read Only Memory (ROM) 26 is connected to CPU 30 via bus 32 and includes the Basic Input/Output System (BIOS) that controls the basic computer functions. RAM 24, I/O adapter 28 and communications adapter 34 are also interconnected to system bus 32. I/O adapter 28 communicates with the disk storage device 50. Communications adapter 34 interconnects bus 32 with the outside network enabling the computer system to communicate with other computers over the Web in an IP telecommunications network. I/O devices are also connected to system bus 32 via user interface adapter 22 and display adapter 36. Keyboard 24 and mouse 26 are all interconnected to bus 12 through user interface adapter 22. It is through such input devices that the user at a receiving station may interactively relate to the network. Display adapter 36 includes a frame buffer 39 that is a storage device that holds a representation of each pixel on the display screen 38. Images may be stored in frame buffer 39 for display on monitor 38. In the composite system shown in FIG. 3, the audio input, i.e. the conversation, is input through the telephone 12, and processed through audio input adapter 29, the functions of which, to be described hereinafter, may be performed on any standard personal computer sound card. The participant's conversation is conventionally processed and output as an IP telephone conversation to the Web via communications adapter 34. Likewise, the conversation input from other participants in the IP telecommunication is received via communications adapter and output either through the audio output of telephone 12 or through the computer speaker 37 via an audio output adapter 35 that may be conventionally implemented on the computer sound card.

With the embodiment of FIG. 3, under control of an appropriate application program 40, the conversation input of the participant on telephone 12 is recorded and temporarily stored on disk drive 50. Then, when a particular interrupt is detected, the most recent conversation segment is stored on drive 50 and a conversation marker is generated that is also stored on drive 50. The stored conversation marker is displayable on display 38 via frame buffer 39. Then, when the user selects a particular conversation marker, the representative stored segment may be output via speaker 37 through audio adapter 35.

While the embodiment of the present invention has been described with IP telephone communications, the invention may be implemented with conventional PSTN (Public Switched Telephone Network) telephones. In a PSTN environment, the conversation of the speaker participant could conveniently be input through an appropriate microphone, processed via the sound card of an associated personal computer and stored on the disk drive of the computer. In order to display the conversation markers or any other input speech, standard speech recognition techniques may be used, such as the conventional techniques described in U.S. Pat. No. 6,937,984 (filed Dec. 18, 1998) may be applied. The functions of the present invention could also be applied in direct (non-telephone) conferences in which the participants use ancillary display computers to track the progress of the live conferences. In such live conferences, the monitoring of interruptions and the storing of appropriate conversation markers would be substantially similar to the implementations used for tracking the conventional PSTN telephone conversations described above.

Figure 4:
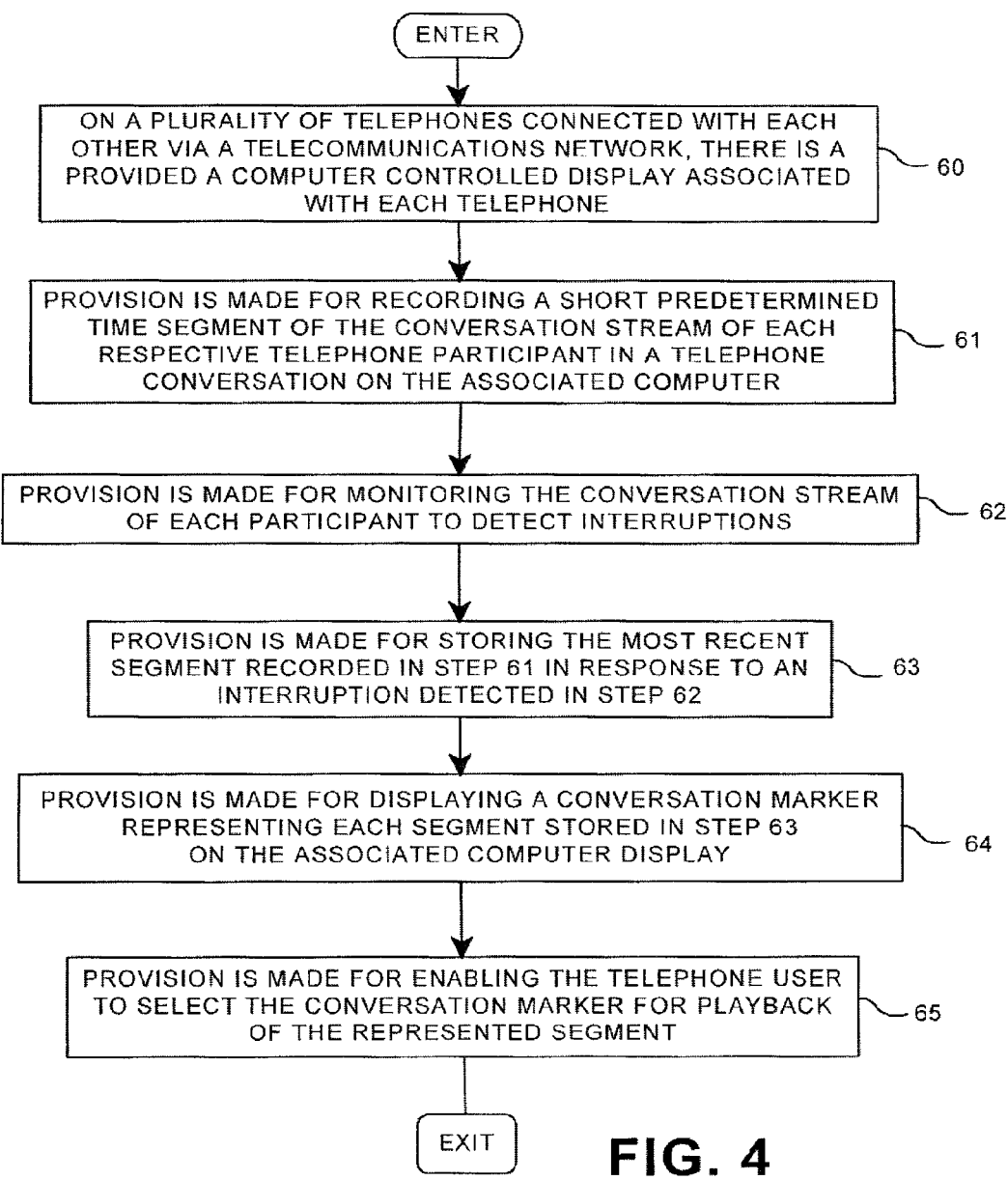
FIG. 4 is an illustrative flowchart describing the setting up of the process of the present invention for the detection and handling of interruptions in telephone conversations between a plurality of participants.

Now, with reference to FIG. 4, we will describe the setting up of a method and computer program according to the present invention for handling the detected interruptions in audio conversation with a plurality of participants. In the practice of the invention, there is provided an IP telephone network with a plurality of telephones, each having an associated computer controlled display, step 60.

For each of a plurality of participants in a telephone conference or conversation, provision is made at each participant's associated computer for continuously recording, as the telephone conversation progresses the last conversation segment, which may be of a predetermined effective time length, e.g. seven seconds. The length of the recorded segment should be sufficient when played back to alert or remind the participant of an interrupted conversation segment that the participant may wish to subsequently recall or continue, step 61. Provision is made for monitoring the conversation stream of a participant for conversation interruptions, step 62. The monitoring seeks triggers that are indicative of a conversation interruption. One of such triggers may be voice overlap. When two or more participants are speaking at the same time, there is likely to be a conversation lapse, i.e. all those speaking are likely to drown each other out, and each will require a conversation marker and the selective ability to playback the interrupted speech. The implementation may also determine the need for an interruption marker based upon the voice inflection of a participant. In English speech, a rise in the voice of the speaker typically indicates the end of a sentence. Thus, if the voice of another participant starts before such a rise in the voice of an original speaker, this may indicate that the original speaker has been interrupted before finishing his sentence. Also, there is a tendency for a speaker interrupting another to raise his voice. Raising the voice can, thus, serve as an interrupt trigger.

Two participants speaking simultaneously may also be determined through the conventional speech recognition techniques referenced hereinabove. Such speech recognition functions could distinguish the speech contents of each participant, and from such contents, determine unfinished words or sentence fragments.

In another embodiment, the user participant is enabled to manually create an interrupt trigger through a suitable input when he finds that the storage of the segment and the conversation marker would be appropriate because of some lack of clarity in the conversation exchange.

With reference again to FIG. 4, provision is made, step 63, for a response to an interrupt trigger in step 62 to store the most recent recorded speech segment in the conversation stream recorded in step 61. Further provision is made, step 64, for creating and displaying, on the associated computer display, the text conversation marker representative of each segment stored in step 63. Provision is made, step 65, for enabling the telephone user to select from the display a conversation markers to thereby playback the stored segment represented by the conversation marker.

Figure 5:
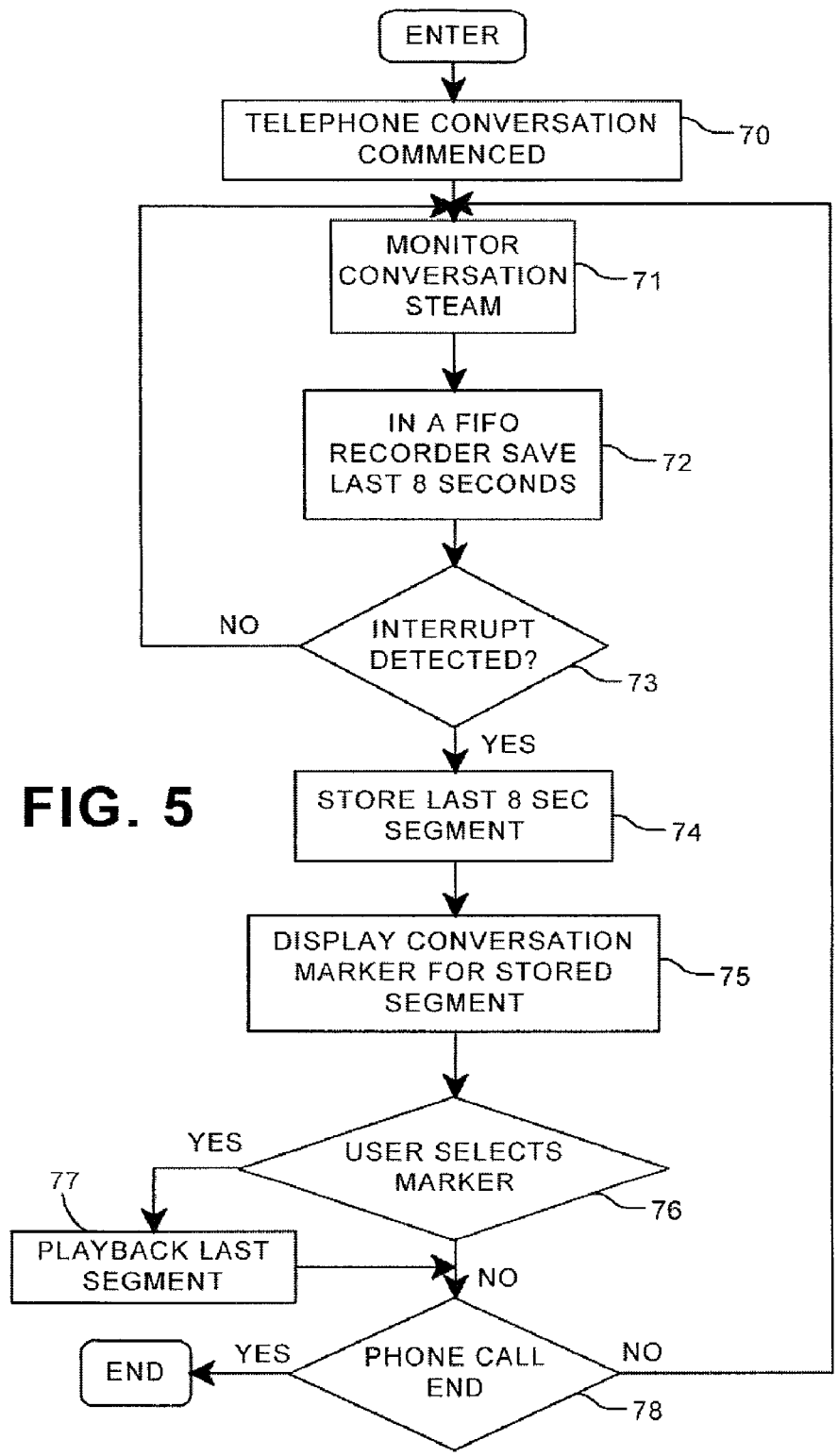
FIG. 5 is a flowchart of an illustrative run of the process setup in FIG. 4.

Now that the basic program set up has been described, there will be described with respect to FIG. 5 a flowchart of an operation showing how the program may be run. An IP telephone conversation is begun, step 70. The conversation stream is monitored, step 71. During the monitored conversation, the last predetermined time segment, e.g. eight seconds, is recorded and saved. The recording may be longer, but at least the last predetermined time period of the conversation, e.g. eight seconds are stored and available. Where recording space is limited, the recording may be made on a FIFO (First In First Out) basis with the latest segment of a plurality of segments always being available, step 72. Next, step 73, a determination is made as to whether an interrupt has been detected. If No, the process is branched back to step 71. If Yes, then the last designated recorded eight second segment of the participant's conversation stream is stored as an audio segment, step 74, and a conversation marker representative of the stored segment is displayed on the participant's display, step 75. The conversation may continue with the stored conversation segment represented by displayed conversation markers. Periodically, or on command, a determination is made as to whether the participant has selected a conversation marker, step 76. If Yes, then the last segment represented by the conversation marker is played back, step 77. If No, or after step 77, a determination may conveniently be made as to whether the telephone conversation is over, step 78. If Yes, the session is exited. If No, the process is returned to step 71.

In the case where the telephone conversation is exited, the stored conversation markers and the recorded segments that these markers represent may be saved and used during any follow-up telephone calls.

One of the implementations of the present invention may be in application program 40 made up of programming steps or instructions resident in RAM 24, FIG. 1, of a Web receiving station during various Web operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Web itself, when required by the user of the present invention.

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer controlled method for detecting interruptions in audio conversations between a plurality of participants comprising:

continuously recording the most recent predetermined time segment of the conversation stream of one participant in said conversation;

monitoring the conversation stream of said one participant for interruptions in said conversation stream;

in response to a detection of an interruption, storing said most recent segment prior to said interruption, said segment being represented by a conversation marker;

displaying said conversation marker; and selecting said conversation marker to playback said most recent segment.

2. The method of claim 1 wherein said audio conversation is a telephone conversation.

3. The method of claim 2 wherein said monitoring said conversation stream for interruptions includes the step of detecting when a plurality of said participants are speaking simultaneously.

4. The method of claim 3 wherein said detecting when a plurality of said participants are speaking determines that said one participant has not completed a sentence before another participant starts speaking.

5. The method of claim 2 wherein said playing back said most recent segment, plays said segment back to a plurality of said participants.

6. A computer controlled method for detecting interruptions in telephone conversations between a plurality of participants comprising:
   continuously recording the most recent predetermined time segment of the conversation stream of one participant in said conversation;
   monitoring the conversation stream of said one participant for interruptions in said conversation stream;
   in response to detection of an interruption, storing said most recent segment prior to said interruption as a conversation marker; and
   selecting said conversation marker to playback said most recent segment.

7. The method of claim 6 further including the step of identifying said stored conversation marker wherein said conversation marker is selectable.

8. A computer controlled display system for detecting interruptions in audio conversations between a plurality of participants, the system comprising:
   a processor;
   a computer memory holding computer program instructions which when executed by the processor perform the method comprising:
   continuously recording the most recent predetermined time segment of the conversation stream of one participant in said conversation;
   monitoring the conversation stream of said one participant for interruptions in said conversation stream;
   in response to a detection of an interruption by said monitoring, storing said most recent segment prior to said interruption, said segment being represented by a conversation marker;
   displaying said conversation marker; and
   selecting said conversation marker to play back said most recent segment.

9. The display system of claim 8 wherein said audio conversation is a telephone conversation.

10. The display system of claim 9 wherein
    said one participant is speaking through a telephone having an incorporated display; and
    said conversation marker is displayed on said incorporated display.

11. The display system of claim 8 wherein said monitoring said conversation stream for interruptions in said performed method includes the step of detecting when a plurality of said participants are speaking simultaneously.

12. The display system of claim 11 wherein said detecting when a plurality of said participants are speaking in said performed method determines that said one participant has not completed a sentence before another participant starts speaking.

13. The display system of claim 9 wherein said conversation stream is manually monitored for interruptions.

14. The display system of claim 9 wherein said playing back said most recent segment in said performed method, plays said segment back to a plurality of said participants.

15. The display system of claim 9 wherein said most recent segment played back is displayed.

16. A computer usable storage medium having stored thereon a non-transitory computer readable program for detecting interruptions in audio conversations between a plurality of participants, wherein the computer readable program when executed on a computer causes the computer to:
    continuously record the most recent predetermined time segment of the conversation stream of one participant in said conversation;
    monitor the conversation stream of said one participant for interruptions in said conversation stream;
    in response to a detection of an interruption by said monitoring, store said most recent segment prior to said interruption, said segment being represented by a conversation marker;
    display said conversation marker; and
    select said conversation marker to play back said most recent segment.

17. The computer usable storage medium of claim 16, wherein said audio conversation is a telephone conversation.

18. The computer usable storage medium of claim 17, wherein:
    said one participant is speaking through a telephone having an incorporated display; and
    said conversation marker is displayed on said incorporated display.

19. The computer usable storage medium of claim 17, wherein the computer program when executed causes the computer to monitor said conversation stream for interruptions by detecting when a plurality of said participants are speaking simultaneously.

20. The computer usable storage medium of claim 17, wherein the computer program when executed causes the computer to play back said most recent segment to a plurality of said participants.

* * * * *